(12) United States Patent
Sala et al.

(10) Patent No.: US 6,816,766 B2
(45) Date of Patent: Nov. 9, 2004

(54) CONTINUOUS COLLISION SEVERITY PREDICTION

(75) Inventors: Dorel M. Sala, Troy, MI (US); Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/305,432

(22) Filed: Nov. 26, 2002

(65) Prior Publication Data

US 2004/0102882 A1 May 27, 2004

(51) Int. Cl.⁷ ............................................. B60R 21/32
(52) U.S. Cl. ........................................ 701/45; 280/735
(58) Field of Search ..................... 701/45; 280/728.1, 280/734, 735; 307/10.1

(56) References Cited

U.S. PATENT DOCUMENTS

| | | | | |
|---|---|---|---|---|
| 5,411,289 A | * | 5/1995 | Smith et al. | 280/735 |
| 5,732,374 A | * | 3/1998 | Ohm | 701/45 |
| 5,967,548 A | * | 10/1999 | Kozyreff | 280/735 |
| 6,186,539 B1 | * | 2/2001 | Foo et al. | 280/735 |
| 6,424,898 B2 | * | 7/2002 | Anishetty et al. | 701/45 |
| 6,424,899 B2 | * | 7/2002 | Imai et al. | 701/45 |
| 6,459,975 B1 | * | 10/2002 | Kuhn et al. | 701/45 |
| 6,499,763 B1 | * | 12/2002 | Mishima | 280/733 |
| 6,532,408 B1 | * | 3/2003 | Breed | 701/45 |
| 6,540,255 B1 | * | 4/2003 | Blank et al. | 280/735 |
| 6,549,836 B1 | * | 4/2003 | Yeh et al. | 701/45 |
| 6,647,331 B2 | * | 11/2003 | Imai et al. | 701/45 |
| 2004/0056459 A1 | * | 3/2004 | Kassman et al. | 280/739 |

FOREIGN PATENT DOCUMENTS

| | | | |
|---|---|---|---|
| DE | 4214222 A1 | * | 4/1993 |
| EP | 0900702 A2 | * | 3/1999 |

* cited by examiner

Primary Examiner—Michael J. Zanelli
(74) Attorney, Agent, or Firm—Kathryn A. Marra

(57) ABSTRACT

A method for continuous collision severity prediction, the method comprising receiving vehicle acceleration data. A collision event is detected in response to receiving the vehicle acceleration data and to the acceleration data. A collision mode is determined in response to detecting the collision event. Input to the collision mode determination includes the acceleration data. A collision severity value responsive to the acceleration data and the collision mode is calculated. The collision severity value corresponds to a percentage inflation level of an airbag.

21 Claims, 7 Drawing Sheets

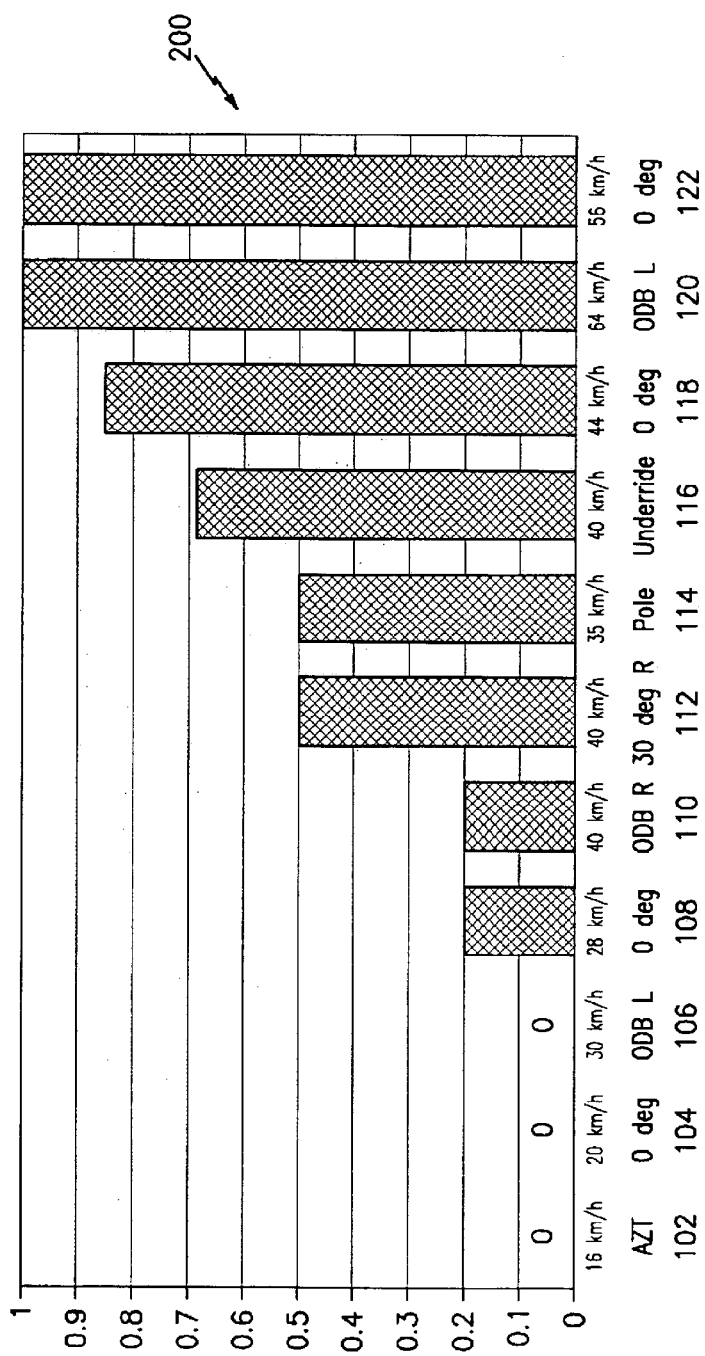

502

| Hidden Layer |||| |
|---|---|---|---|
| $w^1_{ki}$ ||| $b^1_i$ |
| −0.6459 | −0.1548 | −0.0016 | −0.6469 |
| 0.2973 | −0.3174 | −0.0624 | 1.0961 |
| 3.1349 | 7.0245 | −1.6418 | −2.6380 |

504

| Output Layer |||| |
|---|---|---|---|
| $w^2_i$ ||| $b^2$ |
| −5.1214 | 1.0593 | 0.0168 | −4.1304 |

| Hidden Layer |||| |
|---|---|---|---|
| $w^1_{ki}$ ||| $b^1_i$ |
| 0.2200 | 0.0100 | 0.0157 | −0.9491 |
| −0.1148 | 0.2586 | 0.0806 | −4.3379 |
| −0.4943 | 0.1643 | 0.1085 | −2.5992 |

604

| Output Layer |||| |
|---|---|---|---|
| $w^2_i$ ||| $b^2$ |
| 1.2668 | −1.1198 | −0.3193 | −0.3315 |

| Hidden Layer |||| |
|---|---|---|---|
| $w^1_{ki}$ ||| $b^1_i$ |
| 0.0249 | −0.5944 | −0.0032 | 3.3723 |
| 0.0491 | −0.6304 | 0.0018 | 3.0654 |
| 0.1583 | −2.2685 | −0.0354 | 8.7010 |
| −0.2768 | 8.6522 | 0.0737 | −30.8768 |
| 0.0397 | 3.9746 | 0.0032 | −24.9257 |

704

| Output Layer ||||| |
|---|---|---|---|---|---|
| $w^2_i$ ||||| $b^2$ |
| −7.3806 | 6.2657 | −1.5420 | −0.8633 | −5.3937 | −3.4848 |

FIG. 7

CONTINUOUS COLLISION SEVERITY PREDICTION

BACKGROUND OF THE INVENTION

The present disclosure relates generally to predicting collision severity and in particular, to predicting collision severity in a continuous manner, using acceleration signals, for controlling smart occupant protection systems, such as an airbag activation device.

Safety devices for the protection of the operator and passengers of automotive vehicles have been in use for many years. Many safety features function in a collision situation without external activation. Seat reinforcement, seat headrests, and passenger compartment padding are examples of such safety items. Other safety devices such as supplemental inflatable restraints, popularly known as air bags, require external activation when a collision event is apparently occurring.

Air bags comprise an inflatable bag, an electrically actuated igniter and a gas generator. Each bag is folded and stored with its igniter and gas generator in the steering wheel pad, instrument panel, door panel or body pillar. Air bags also require a collision detection system that determines when the bags should be deployed and signals the ignition of one or more charges (or stages) of the gas generator. Current air bag, and other passive occupant protection systems, rely on acceleration sensors (detecting abrupt vehicle deceleration) and a microprocessor based controller. An acceleration sensor is a device that continually senses accelerative forces and converts them to electrical signals. The controller continually receives acceleration signals from each sensor and processes them to determine whether a collision situation is occurring that requires air bag deployment.

The content of such a collision detection system for safety device actuation usually depends upon the method or algorithm used by the controller for assessing collision severity. Most systems rely on an acceleration sensor placed in the passenger compartment, close to the center of gravity of the vehicle. This sensor is often put under the passenger seat as part of a sensing and diagnostic module (SDM) of the vehicle collision sensing system. In addition, some systems place one or more accelerometers at the center or sides of the radiator cross-tie-bar to detect vehicle front-end deceleration indicative of a collision. These front-end accelerometers have been called electronic front sensors (EFS). The collision detection controller receives signals from the acceleration sensor(s) and evaluates them in a pre-programmed manner to determine whether air bag deployment is necessary. The program may also determine the ignition of one or more charges (or stages) of the gas generator of the air bag.

Collision detection algorithms have involved increasing degrees of complexity. Acceleration values from a single sensor (e.g., the SDM sensor) have simply been compared with a pre-determined threshold acceleration value as a test for device deployment. Values from more than one sensor location have been used in the collision sensing practices. Acceleration values have been integrated over time to yield crush velocities, and further integrated to yield crush displacement values. Further, the derivative of acceleration values have been determined as "jerk" values. Such velocity and displacement values, and jerk values, have also been compared with respective pre-determined threshold values as a more selective basis for achieving timely air bag deployment. They also have been used in combination with seat occupancy information and seat belt usage.

There are variants in vehicle front-end collision modes and, of course, there can be considerable variation in the severity of a collision depending upon the construction and mass of the striking vehicle and the struck vehicle or object, and their relative velocity and moving direction at the onset of a collision. With respect to front-end collision modes, a vehicle may collide head-on with another vehicle or a stationary object such as a rigid wall, either fully or partially overlapped (called a full frontal collision mode and an offset frontal collision mode, respectively), or with a narrower stationary object such as a pole or a tree (called a frontal pole collision mode). Front-end collision of a vehicle with other vehicle or stationary object in angle is called an angular collision mode.

Actual vehicular collision testing reveals different patterns of front-end and passenger compartment crush velocities and displacements associated with different collision modes. In fact, considerable collision testing of a vehicle has been required to provide the substantial database of threshold values of jerk, acceleration, velocity and/or displacement over a collision period for use by a collision-sensing controller. Such data must be compiled from suitably instrumented test vehicles over the relevant duration of each test collision. Depending upon the nature and severity of a collision, an airbag deployment decision may be made by the controller process at any time during a period of from about 15 milliseconds to 100 milliseconds or so from the onset of the collision. A controller for a dual stage airbag system can be instructed to inflate the airbag to one of two levels. In contrast, a continuous flow airbag can be instructed to inflate the airbag to any level based on input to a variable output inflator.

BRIEF DESCRIPTION OF THE INVENTION

In an exemplary embodiment, the method comprises receiving vehicle acceleration data. A collision event is detected in response to the vehicle acceleration data. A collision mode is determined in response to detecting the collision event. Input to the collision mode determination includes the acceleration data. A collision severity value responsive to the acceleration data and to the collision mode is calculated. The collision severity value corresponds to a percentage inflation level of an airbag.

In another aspect, a method for continuous collision severity prediction comprises receiving vehicle acceleration data. A collision event is detected in response to receiving the vehicle acceleration data. An airbag deployment request is transmitted to an airbag controller in response to the detecting. A collision mode is determined in response to detecting the collision event. Input to the collision mode determination includes the acceleration data. A collision severity value responsive to the acceleration data and the collision mode is calculated. The collision severity value corresponds to a percentage inflation level of an airbag. The collision severity value is transmitted to the airbag controller.

In a further aspect, a system for continuous collision severity prediction comprises an airbag controller, a SDM accelerometer, an EFS accelerometer and a collision detection controller. The collision detection controller is in communication with the airbag controller, the SDM accelerometer and the EFS accelerometer. The collision detection controller includes instructions to implement a method comprising receiving vehicle acceleration data. A collision event is detected in response to receiving the vehicle acceleration data. A collision mode is determined in response to detecting the collision event. Input to the collision mode determination includes the acceleration data. A collision severity value responsive to the acceleration data and the collision mode is calculated. The collision severity value corresponds to a percentage inflation level of an airbag.

BRIEF DESCRIPTION OF THE DRAWINGS

Referring to the exemplary drawings wherein like elements are numbered alike in the several FIGURES:

FIG. 2 is a chart of the estimated occupant impact velocities from FIG. 1 in normalized form;

FIG. 3 depicts sample values of coefficients that can be utilized in an exemplary embodiment of the present invention that utilizes a regression approach to predicting collision severity;

FIG. 5 is a table of exemplary frontal mode network weights and biases for utilizing a neural network approach to predicting collision severity;

FIG. 6 is a table of exemplary pole network weights and biases for utilizing a neural network approach to predicting collision severity;

FIG. 7 is a table of angle/ODB mode network weights and biases for utilizing a neural network approach to predicting collision severity;

DETAILED DESCRIPTION OF THE INVENTION

A method of continuous collision severity prediction is presented. Briefly stated, the method continuously predicts the severity of a collision in real-time. The method also determines the airbag deployment time of a collision event. The target application of the method is a smart occupant protection system such as an airbag system with a variable output inflator. A variable output inflator is designed to supply a variable amount of gas into an airbag proportional with the severity of a collision. The airbag can be filled to a percentage inflation level (e.g., fifty percent full, eighty percent full). The deployment and severity outputs of the collision severity prediction method can be used for controlling the gas output of a variable output inflator attached to an air bag.

An embodiment of the present invention utilizes both an EFS and a SDM acceleration sensor. The EFS is located at the center of the radiator tie bar at the front of the vehicle engine compartment. The radiator tie bar is close to the front of the vehicle and the sensor located there provides acceleration data reflecting the collision experienced at the front of the vehicle. A SDM accelerometer can be located under a front passenger seat in the passenger compartment of the vehicle. This location is a standard location for an accelerometer that transmits data to the airbag inflation controller. This acceleration sensor location is sometimes also used for other vehicle or chassis control and/or diagnostic purposes. Alternatively, the SDM accelerometer can be located under the driver's seat or in the center of the tunnel but inside the vehicle and away from the crush zone. The acceleration sensors are electrically powered and continually supply their signals to the collision detection controller during vehicle operation. The controller includes a microprocessor that continually receives and analyzes acceleration data from the two sensors to determine the existence of a collision situation that requires deployment of an airbag.

Three front-end collision modes of the vehicle are utilized in an exemplary embodiment of the present invention. One collision mode, which will be called frontal mode, is a full frontal collision mode representative of a head-on collision of the vehicle with another vehicle or a stationary object such as a concrete wall. The second collision mode, which will be called angle/ODB mode, includes an angular mode in which the object that is struck is struck at an angle between a head-on collision and a side impact, and an offset deformable barrier (ODB) collision mode in which the collision is with a deformable object such as another vehicle that is offset to one side of the striking vehicle. The third mode, which will be called pole mode, includes collisions with a pole-like object at the front of the vehicle.

Figure 1:
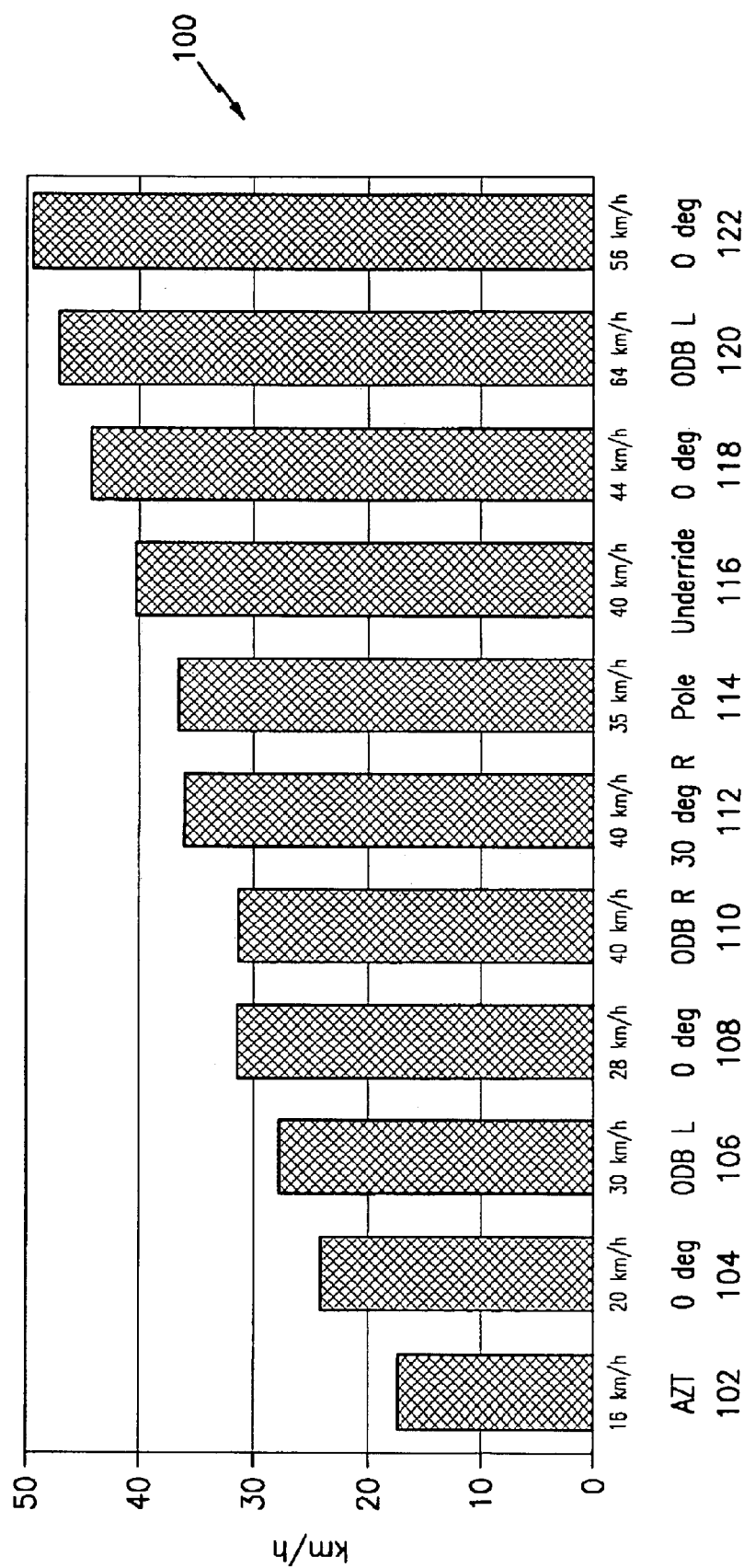
FIG. 1 is a chart of the estimated occupant impact velocities for eleven different events ranked in ascending order of severity.

In an exemplary embodiment of the present invention, collision severity determination is based on the estimated impact velocity of the occupant with the steering wheel measured in kilometers per hour. The occupant is assumed to be in free flight and at a set distance (e.g., three-hundred and fifty millimeters) from the steering wheel. FIG. 1 is a chart of the estimated impact velocities for eleven different collision events ranked in ascending order of severity and includes severity rankings that will vary based on variables such as weight of the vehicle and distance from the steering wheel. The collision test labeled "16 km/h AZT" 102 is a 40% overlap offset frontal collision with a fixed rigid barrier at 16 km/h. The collision test labeled "20 km/h 0 deg" 104 is a full frontal collision with a rigid barrier for a car traveling at twenty kilometers per hour. Similarly, the collision tests labeled "28 km/h 0 deg" 108, "44 km/h 0 deg" 118 and "56 km/h 0 deg" 122 are full frontal rigid barrier collisions for a vehicle traveling at each speed specified. The collision test labeled "30 km/h ODB L" 106 is a left side collision with an offset deformable barrier for a car traveling at thirty kilometers per hour. Likewise, the collision test labeled "64 km/h ODB L" 120 is a left side collision with an offset deformable barrier for a car traveling at sixty four kilometers per hour and the collision test labeled "40 km/h ODB R" 110 is a right side collision with an offset deformable barrier for a car traveling at forty kilometers per hour. FIG. 1 includes a pole collision test labeled "35 km/h Pole" 114 representing a collision with a pole at the specified speed and an underride impact test labeled "40 km/h Underride" 116 representing an underride collision with another vehicle at the specified speed. Finally, the collision test labeled "40 km/h 30 deg R" 112 is a collision on the right side of a vehicle with a rigid barrier at a thirty degree angle for a vehicle traveling at forty kilometers per hour.

The data in FIG. 1 depicts only some examples of collision events, other collision events and severity rankings are possible. In addition, the exemplary embodiment depicted in FIG. 1 utilizes an estimated occupant impact velocity to define the severity of a collision. Other means of defining the severity of a collision can be utilized by an alternate embodiment of the present invention. For example, severity of a collision can be defined in terms of injury criteria.

FIG. 2 is a chart of the estimated occupant impact velocities from FIG. 1 in normalized form. The normalized values in FIG. 2 range from zero to one, however, any scale (e.g. one to one-hundred) could be utilized. Translating the absolute occupant impact velocities into relative values can be useful in determining the amount of gas that should be output from a variable output inflator to an air bag. The relative values can be associated with a percentage inflation level for the air bag. In the example depicted in FIG. 2, the first three test events "16 km/h AZT" 102, "20 km/h 0 deg" 104 and "30 km/h ODB L" 106 do not need the air bag to be deployed so they are given a normalized severity value of zero. The next two test events "28 km/h 0 deg" 108 and "40 km/h ODB R" 110 have been given a relative severity value of two tenths. Similarly, the test events "40 km/h 30 deg R" 112 and "35 km/h Pole" 114 are assigned the severity value one half. The test event labeled "40 km/h Underride" 116 is assigned the severity value sixty-eight hundredths, "44 km/h 0 deg" 118 is assigned the severity value eighty-five hundredths, "64 km/h ODB L" 120 is assigned the severity value one and "56 km/h 0 deg" 122 is assigned the severity value one. A severity value of one would cause the airbag to be inflated to the maximum level.

In practice, the deployment of the air bag takes place some amount of time prior to the occupant making contact with the steering wheel. Therefore, the crash severity must be predicted in real time for the airbag to be deployed prior to occupant impact with the steering wheel and/or instrument panel. It is assumed that the prediction of the severity of an event can be reasonably accurate for some period of time (e.g., 20 milliseconds) past the time that the deployment of airbag is triggered. A regression approach can be utilized to predict collision severity, based on information obtained from the sensor at the SDM location. An exemplary embodiment of the present invention utilizes the following formula to predict the collision severity, at time t, in normalized form:

$$\text{severity}(t) = [ks \cdot \{Ss(t)/t^2\}] - [kv \cdot \{Vsd/t\}]$$

where Ss(t) is the SDM displacement at time t, and t is the elapsed time from the moment the collision is detected. The coefficient of displacement, ks, is a parameter that depends on the collision mode. In general, a frontal mode is associated with a lower coefficient of displacement than an angle/ODB mode or a pole mode, and an angle/ODB mode is associated with a lower coefficient of displacement than a pole mode. The coefficient of velocity, kv, is a parameter that also depends on the collision mode. In general, a frontal mode is associated with a lower coefficient of velocity than an angle/ODB mode or a pole mode, and an angle/ODB mode is associated with a higher coefficient of velocity than a pole mode. Vsd is the SDM velocity at initial airbag deployment time and is used in the severity prediction formula to offset the effect of large displacement values on events that need airbags to be deployed late. The influence of Vsd in the formula decreases with time.

As mentioned previously, both a coefficient of displacement, ks, and a coefficient of velocity, kv, are calculated for each of the three collision modes using regression analysis and collision test data. The values of the coefficients must provide not only the ranking in each collision mode but also the ranking in the overall collision events. To derive the coefficients, the values of the displacements for a pre-selected time period past deployment time (e.g., twenty milliseconds) and the SDM velocities at deployment time are calculated for each collision mode. At the initial airbag deployment time the air bag inflation is initiated and the air bag continues to be inflated as needed, through input to the airbag inflation controller, for the duration of the pre-selected time period. A linear regression technique can be utilized to determine the initial values for the coefficients. The values thus obtained can be modified and fine-tuned based on further testing results. FIG. 3 depicts values of the coefficients that can be utilized in an exemplary embodiment of the present invention for each of the three collision modes. FIG. 3 includes a value for ks, the coefficient of displacement 302 and kv, the coefficient of velocity 304. The values indicated in FIG. 3 correspond to displacements in centimeters, velocities in kilometers per hour and times in milliseconds. The actual values utilized in a particular embodiment of the present invention will vary between implementations based on a number of factors including vehicle construction, weight and location of the sensors, etc.

Figure 4:
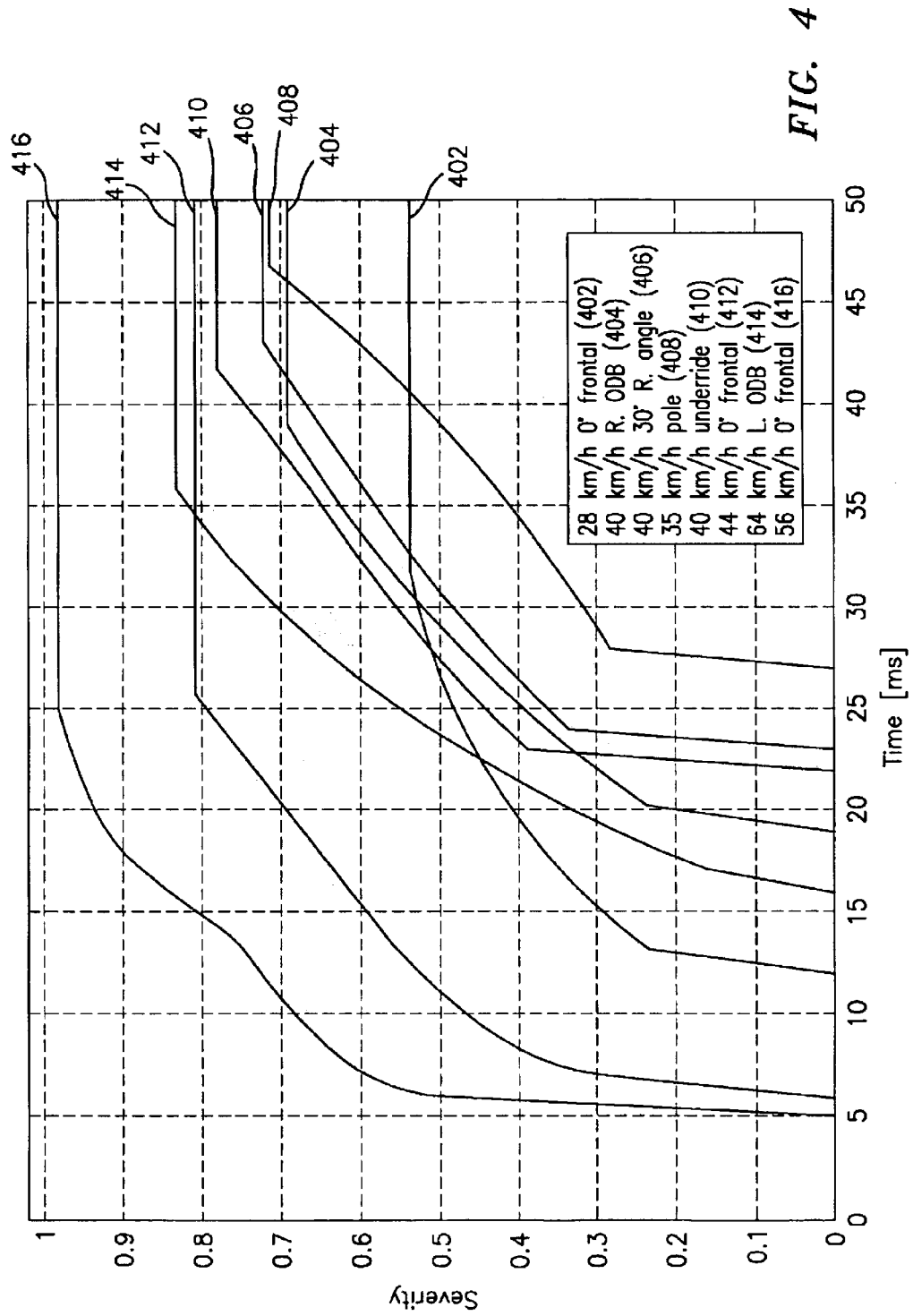
FIG. 4 is a chart of the estimated collision severity for eight exemplary deployment events utilizing a regression approach to predicting collision severity.

FIG. 4 is a chart of the predicted collision severity for eight exemplary deployment events utilizing a regression approach to predicting collision severity. The time is indicated in milliseconds after event detection. As shown in FIG. 4, for some events the severity at deployment time may be very small but within the time window of twenty milliseconds they reach their rank. FIG. 4 includes data for eight exemplary deployment events including: "28 km/h 0° frontal" 402, "40 km/h R. ODB" 404, "40 km/h 30° R. angle" 406, "35 km/h pole" 408, "40 km/h underride" 410, "44 km/h 0° frontal" 412, "64 km/h L. ODB" 414 and "56 km/h 0° frontal" 416. The symbol "°" in FIG. 4 represents the word degree. In an exemplary embodiment of the present invention, severity is a monotonic continuous function with a smooth output that can be used to control the variable output inflation mechanism attached to an airbag. Severity is zero until the initial airbag deployment time.

In an alternate embodiment of the present invention, a neural network approach is utilized to determine a mapping function for predicting the severity within a preset time window (e.g. 20 ms) from the time the airbag deployment is triggered. Inputs to the neural network include t, the elapsed time from collision detection; Ss, the SDM displacement at time t; either Vsd, the SDM velocity at the time airbag deployment was triggered, or Sfd, the EFS displacement at the time airbag deployment was triggered. The neural network output represents the severity. The neural network can be trained using data from collision tests or from simulation of various events in the three collision modes. The desired neural network outputs can be defined as linear functions starting from zero and ending at the value corresponding to the normalized ranking. The neural network utilized is a typical multi-layer network with three inputs corresponding to the measures, one hidden layer and one output neuron. The output, y, of the network can be represented by the equation:

$$y = \sum_i w_i^2 \cdot \text{tansig}\left(\sum_k w_{ki}^1 x_k + b_i^1\right) + b^2$$

where $x_k$ are the inputs, $w_{ki}^1$ represents the weight from input k to neuron i, $b_i^1$ is the bias of neuron i, $w_i^2$ represents the weight from the hidden layer neuron i to the output neuron, and $b^2$ is the bias of the output neuron.

The resulting weights and biases that are developed during the neural network training are calculated once and then recorded in the microprocessor that controls the airbag deployment. FIG. 5 is a table of exemplary frontal mode network weights and biases that could be utilized in a neural network approach to predicting collision severity, including values for the hidden layer 502 and the output layer 504. Inputs, $x_k$, to the neural network for the frontal mode include Ss, Vsd and t; and three neurons are utilized in the hidden layer. FIG. 6 is a table of exemplary pole mode network weights and biases that could be utilized in a neural network approach to predicting collision severity, including values for the hidden layer 602 and the output layer 604. Inputs, $x_k$, to the neural network for the pole mode include Ss, Vsd and t; and three neurons are utilized in the hidden layer. Similarly, FIG. 7 is a table of angle/ODB mode network weights and biases that could be utilized in a neural network approach to predicting collision severity, including values for the hidden layer 702 and the output layer 704. Inputs, $x_k$, to the neural network for the angle/ODB include Ss, Sfd and t; and five neurons are utilized in the hidden layer.

Figure 8:
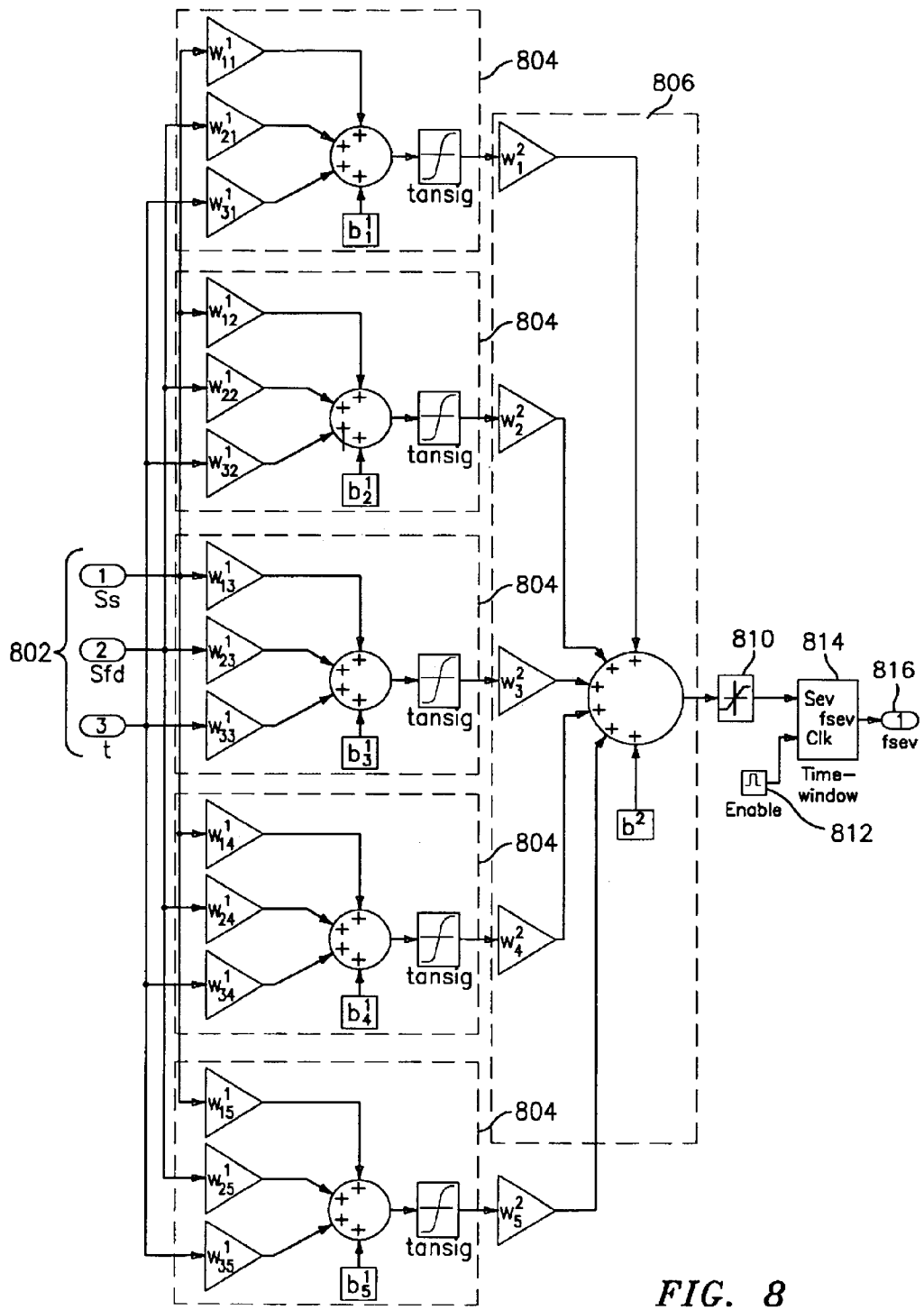
FIG. 8 is a block diagram of a neural network model for estimating the severity of an angle/ODB collision mode event.

FIG. 8 is a block diagram of a neural network model for estimating the severity of an angle/ODB collision mode event using the hidden layer 702 weights and biases such as those depicted in FIG. 7. Inputs 802 to the neural network include the SDM displacement value, Ss, the EFS displacement at deployment time, Sfd, and the elapsed time from the event detection, t. The inputs 802 are entered into the five neurons 804 of the hidden layer of the neural network. Each hidden layer neuron scales the inputs according to its weight values and adds the results together with its bias value. The hyperbolic tangent sigmoid function (tansig) is then applied to the sum, resulting in the output of the hidden layer neuron. The outputs of the hidden layer neurons are the inputs of the output layer neuron 806. The output of the output layer neuron is given by the weighted summation of its inputs together with its bias. The saturation block 810 limits the neural network outputs to values between zero and one. Presumably, a higher speed angle collision would have a higher severity value than a lower speed angle collision. If the airbag is at maximum inflation level for the lower speed angle collision, it cannot be inflated more. Rather than limiting in the model the severity to one for all collisions above a certain speed we are only limiting the value used to control the inflator. When the time window module 814 is enabled by the enable pulse 812, the severity signal 816 is output. In the neural network embodiment depicted in FIG. 8, linear functions are utilized as the target for the learning process but alternate embodiments can utilize other dependencies.

Other methods in addition to regression analysis and neural networks can be utilized in alternate embodiments of the present invention to predict collision severity.

Figure 9:
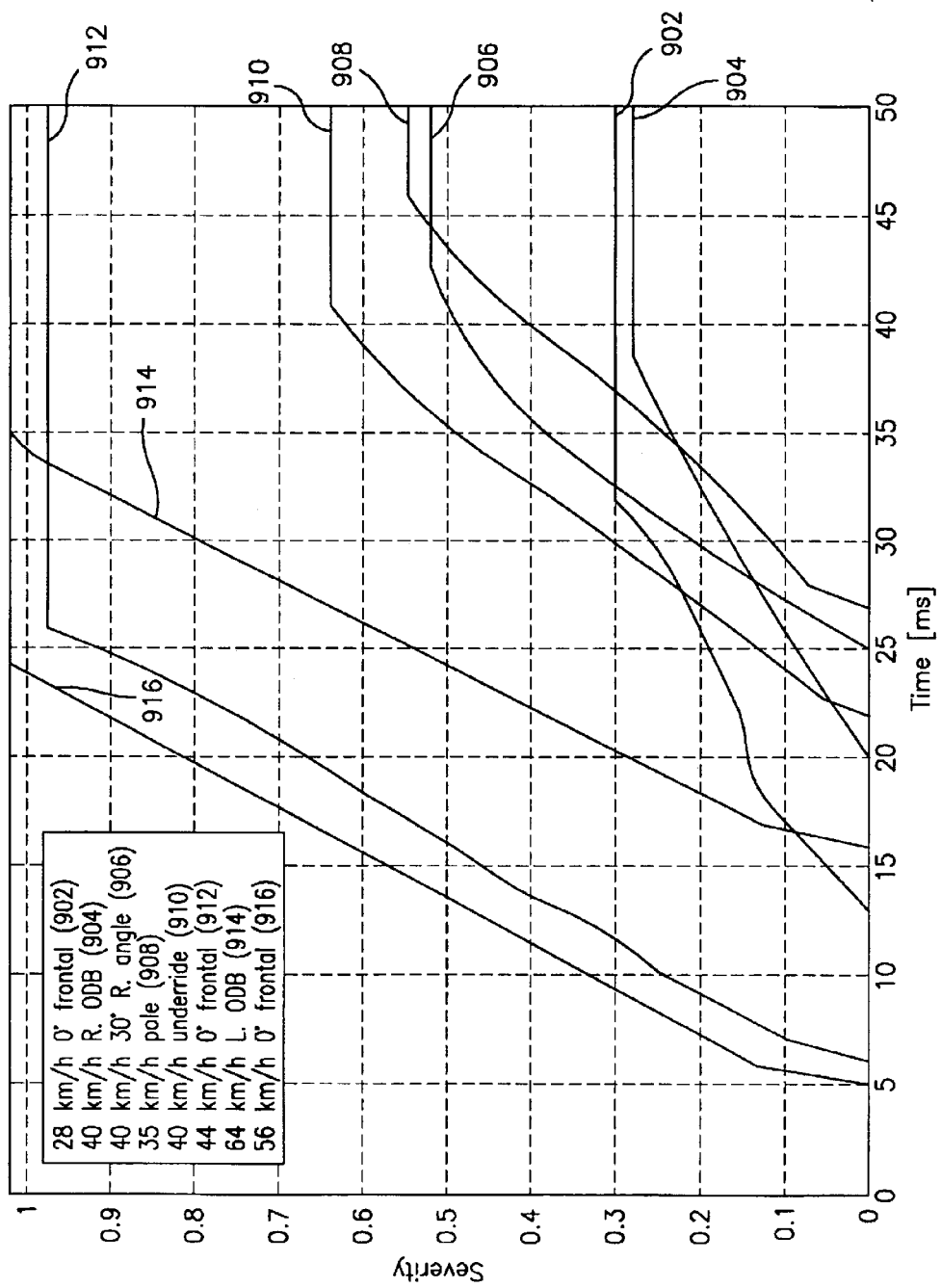
FIG. 9 is a chart of the estimated collision severity for eight exemplary deployment events utilizing a neural network approach to predicting collision severity.

FIG. 9 is a chart of the estimated collision severity for the eight exemplary deployment events utilizing a neural network approach to predicting collision severity. The time is indicated in milliseconds after event detection. These are the same eight exemplary events that were charted in FIG. 4 and include: "28 km/h 0° frontal" 902, "40 km/h R. ODB" 904, "40 km/h 30° R. angle" 906, "35 km/h pole" 908, "40 km/h underride" 910, "44 km/h 0° frontal" 912, "64 km/h L. ODB" 914 and "56 km/h 0° frontal" 916. Again, the symbol "°" in FIG. 9 represents the word degree.

Figure 10:
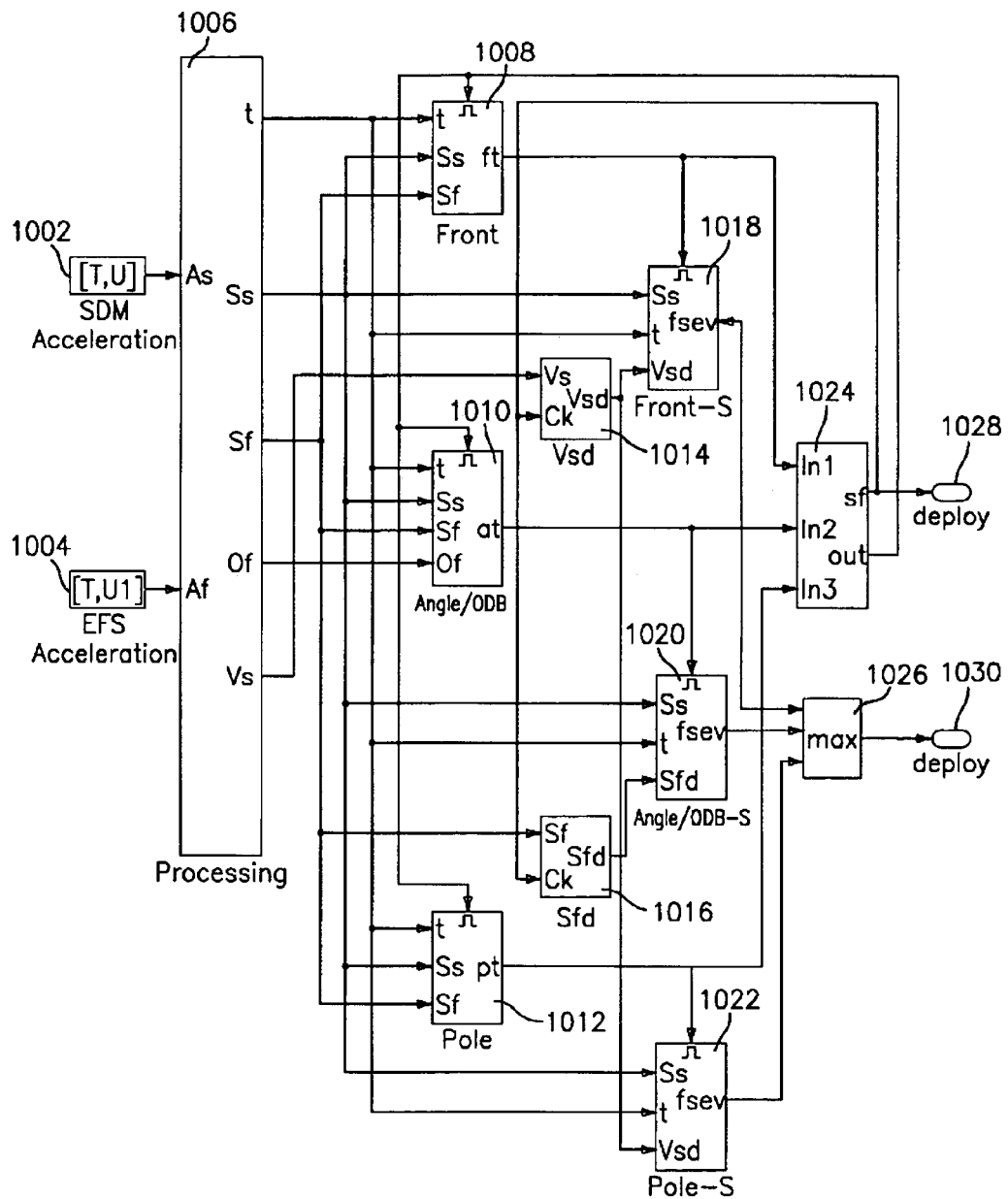
FIG. 10 is a block diagram of an algorithm for determining airbag deployment time, collision mode and severity of an event.

In an exemplary embodiment of the present invention, an algorithm determines the collision mode and deployment time first, and then estimates the severity of the event as described above. FIG. 10 is a block diagram of an algorithm for determining airbag deployment time, collision mode and severity of an event. Data from the SDM accelerometer 1002 and data from the EFS accelerometer 1004 are entered into a processing module 1006 that calculates displacement and velocity values from the input data. In an exemplary embodiment, the processing module 1006 uses the digitized acceleration signals, As and Af, from both the SDM accelerometer 1002 and the EFS accelerometer 1004 to enable (or initiate) operation of the collision sensing method of this invention. The control method determines whether the acceleration, As, at the passenger compartment location is equal to or greater than a predetermined acceleration threshold which, for example, may be set at 2 g's (g being the acceration due to gravity). At the same time the acceleration, Af, of the EFS is compared with a larger threshold acceleration of, e.g., 8 to 12 g, suitable for the specific vehicle. If both As and Af are not greater than their respective enable thresholds, the program loops back to monitoring the input. This controller cycle can be repeated every millisecond or so.

When the processing module 1006 in FIG. 10 detects that a value of As is greater than its enable threshold, the program initiates the system clock, t, and starts calculations of SDM velocity and displacement. If Af does not then surpass its enable threshold within a predetermined time period, e.g., 10 to 20 milliseconds, from the SDM enabling, the program is reset and loops back to monitoring inputs. But if a timely value of Af is obtained that is greater than its enable threshold the calculation of the measures at the EFS is started. Conversely, if Af exceeds its enable threshold first, the program initiates the system clock, t, and starts the calculation of velocities and displacements at the EFS. If, As does not surpass its enable threshold within a predetermined period, e.g., 10 to 20 ms, after the EFS sensor enabling, the program resets and loops back to monitoring the acceleration inputs. But if a timely value of As is obtained that is greater than its enable threshold, then the calculation of the measures at the SDM location is started. The sensing system is reset in the case of minor collision incidents by a reset module which determines whether the SDM velocity measure, Vs, is equal to or greater than a predetermined threshold. If Vs is not equal to or greater than the reset threshold, the program loops back to monitoring the input. If Vs is greater than the threshold, the program advances to detailed collision analysis.

Once the collision severity determining method is enabled, the velocities and displacements are calculated and output to the three branching program modules depicted in FIG. 10; the front module 1008, the angle/ODB module 1010 and the pole module 1012. Output from the processing module 1006 includes elapsed time from collision detection, t; SDM displacement, Ss; EFS displacement, Sf; the difference between the displacement of the EFS calculated from the absolute acceleration and the regular EFS displacement, Of; and velocity of the SDM, Vs. As described above, the events are classified into three modes: frontal mode, angle mode and pole mode based on their similar collision signatures. The decision whether or not to deploy the airbag is made by three parallel modules (front module 1008, angle/ODB module 1010 and pole module 1012) that compare SDM and EFS displacement measures with a set of thresholds. The thresholds of each module are calibrated based on test data from the simulation of events that belong to the same collision mode.

The front module 1008 determines if a full frontal barrier impact event has occurred. Full frontal barrier impact events are characterized by high values of displacements at both the SDM and EFS locations. By establishing higher thresholds for both displacements they can be discriminated against other collision modes. When both SDM and EFS displacements are above their respective thresholds the deployment of the air bag is enabled through the signal labeled "ft" being sent to the deployment module 1024. The deployment module 1024 generates the deploy output 1028 that can be sent to an air bag controller in order to deploy the air bag. The signal labeled "ft" is also utilized to enable the front-s module 1018 in order to determine the severity of the frontal collision as described above. The velocity of the SDM at deployment time, Vsd is provided by the Vsd module 1014. The Vsd module 1014 captures and holds the velocity of the SDM at the time the airbag was initially deployed. For a set period of time (e.g., 20 milliseconds) after the deployment of the airbag, the front-s module 1018 continues to receive updated input data (e.g., every millisecond) in order to update the severity calculation, fsev-s. The severity module 1026 continues to update the severity output 1030 with the maximum severity from the three severity modules. The updated severity output 1030 can be utilized to further inflate the deployed air bag by sending the severity output 1030 to the airbag inflation controller.

As determined by the angle/ODB module 1010, the angle impact events are characterized by lower values for displacements than the full frontal events, especially at the SDM location. For the higher impact speed events in this category the EFS displacement is significantly larger than for all the non-deploy events. The decision to deploy the airbag is made when both displacements surpass their thresholds. Low impact speed collision events in the angle collision mode have low values of the SDM and EFS displacements and cannot be discriminated based solely on these measures. In addition, another measure is utilized in this collision category, namely the Of value which is calculated as the difference between the displacements at EFS calculated from the absolute acceleration and the regular EFS displacement. When both SDM and EFS displacements, and the new measure, Of, are above their respective thresholds the deployment of the air bag is initiated through the signal labeled "at" being sent to the deployment module 1024. The signal labeled "at" is also utilized to enable the angle/ODB-S module 1020 in order to determine the severity of the angle collision as described above. The displacement of the EFS at deployment time, Sfd is provided by the Sfd module 1016. The Sfd module 1016 captures and holds the displacement of the EFS at the time the airbag deployment was triggered. For a set period of time (e.g., 20 milliseconds) after the deployment of the airbag is triggered, the angle/ODB-S module 1020 continues to receive updated input data (e.g., every millisecond) in order to update the severity calculation, fsev-a, for input to the severity module 1026.

The pole module 1012 determines if a pole impact event has occurred. Pole impact events are characterized by a very low SDM displacement value and high EFS displacement values. When both SDM and EFS displacements are above their respective thresholds the deployment of the air bag is enabled through the signal labeled "pt" being sent to the deployment module 1024. The deployment module 1024 generates the deploy output 1028 that can be sent to an air bag controller in order to deploy the air bag. The signal labeled "pt" is also utilized to enable the pole-s module 1022 in order to determine the severity of the pole collision as described above. For a set period of time (e.g., 20 milliseconds) after the initial deployment of the airbag, the pole-s module 1022 continues to receive updated input data (e.g., every millisecond) in order to update the severity calculation, fsev-p for input to the severity module 1026.

The disclosed invention provides an algorithm to continuously predict the severity of a collision in real time. The severity of each event is predicted by a function of displacement and time. The algorithm is Finite Element Analysis (FEA) compatible because it only utilizes cumulative measures like velocity and displacement in making the airbag deployment decision. Both deployment and severity outputs of the algorithm can be utilized for controlling the gas output of a variable output inflator. This can result in the exact amount of gas, as required based on the severity of collision event, being entered into the airbag to reach a particular inflation level. The continuous updating of the severity estimates can allow for an airbag to be further inflated based on new data received after the initial deployment decision. In addition, an embodiment of the present invention could be utilized to control dual airbags by selecting a threshold (e.g., "0.75") between the two stages.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments, falling within the scope of the appended claims. Moreover, the use of the terms first, second, etc. do not denote any order or importance, but rather the terms first, second, etc. are used to distinguish one element from another.

What is claimed is:

1. A method for continuous collision severity prediction, the method comprising:
   receiving vehicle acceleration data from a sensing and diagnostic module (SDM) accelerometer and at least one electronic front sensor (EFS) accelerometer;
   detecting a collision event in response to said receiving and to said acceleration data;
   calculating velocity and displacement for said EFS and said SDM in response to said detecting, said calculating velocity and displacement responsive to said acceleration data;
   determining a collision mode in response to said detecting, wherein input to said determining includes said EFS velocity, said EFS displacement, said SDM velocity and said SDM displacement;

calculating a collision severity value responsive to said SDM velocity, to said SDM displacement and to said collision mode, wherein said collision severity value corresponds to a percentage inflation level of an airbag, said percentage inflation level along a continuum ranging from not deployed to fully deployed; and continuously monitoring said SDM velocity and said SDM displacement.

2. The method of claim 1 wherein said collision severity value is a number ranging from zero to one.

3. The method of claim 1 wherein said collision severity value is a percentage ranging from one to one-hundred.

4. The method of claim 1 wherein said continuously monitoring includes repeating said receiving vehicle acceleration data from said SDM accelerometer, said calculating said SDM velocity, said calculating said SDM displacement and said calculating a collision severity value, wherein said repeating occurs on a periodic basis for a pre-selected time interval following said detecting.

5. The method of claim 4 wherein said periodic basis is one millisecond and said pre-selected time interval is twenty milliseconds.

6. The method of claim 1 wherein said calculating a collision severity value is performed using a neural network approach.

7. The method of claim 6 wherein said calculating is performed in accordance with the function:

severity (t)=function (t, Sfd, Vfs, Vsd, Ss(t)) where, t is elapsed time from collision detection, Sfd is EFS displacement at initial airbag deployment time, Vfd is EFS velocity at initial airbag deployment time, Vsd is SDM velocity at initial airbag deployment time, and Ss(t) is SDM displacement at time t.

8. The method of claim 7 wherein the parameters of said function correspond to said collision mode.

9. The method of claim 1 wherein said collision mode includes one of full frontal impact, angular impact, offset deformable barrier and pole impact.

10. The method of claim 1 further comprising transmitting said collision severity value to an airbag controller in response to said calculating a collision severity value.

11. The method of claim 10 wherein said airbag controller is in communication with said airbag and said airbag includes a variable output inflator responsive to said collision severity value.

12. The method of claim 10 wherein said airbag controller is in communication with a dual stage airbag.

13. A method for continuous collision severity prediction, the method comprising:

receiving vehicle acceleration data from a sensing and diagnostic module (SDM) accelerometer and at least one electronic front sensor (EFS) accelerometer;

detecting a collision event in response to said receiving and to said acceleration data;

calculating velocity and displacement data for said SDM and said EFS in response to said detecting, said calculating velocity and displacement data responsive to said acceleration data;

determining a collision mode in response to said detecting, wherein input to said determining includes said velocity and said displacement data;

comparing said velocity data and said displacement data with corresponding velocity and displacement threshold values to determine if an airbag requires activation;

activating the airbag if said comparing results in a determination that said activation is required;

transmitting an initial airbag inflation level to an airbag controller connected to the airbag in response to said activating;

calculating a collision severity value responsive to said SDM accelerometer data and to said collision mode, wherein said collision severity value corresponds to a percentage inflation level of the airbag, said percentage inflation level along a continuum ranging from not deployed to fully deployed; and transmitting said collision severity value to said airbag controller in response to said calculating.

14. A system for continuous collision severity prediction, the system comprising:

a SDM accelerometer;

at least one EFS accelerometer; and a collision detection controller in communication with airbag controller, said SDM accelerometer and said at least one EFS accelerometer, said collision controller including instructions to implement a method comprising:

receiving vehicle acceleration data from said SDM accelerometer and said EFS accelerometer;

detecting a collision event in response to said receiving and to said acceleration data;

calculating velocity and displacement for said EFS and said SDM in response to said detecting, said calculating velocity and displacement responsive to said acceleration data;

determining a collision mode in response to said detecting, wherein input to said determining includes said EFS velocity, said EFS displacement, said SDM velocity and said SDM displacement;

calculating a collision severity value responsive to said SDM velocity, to said SDM displacement and to said collision mode, wherein said collision severity value corresponds to a percentage inflation level of an airbag, said percentage inflation level along a continuum ranging from not deployed to fully deployed; and continuously monitoring said SDM velocity and said SDM displacement.

15. The system of claim 14 wherein said collision detection controller includes instructions to implement a method further comprising transmitting said collision severity value to an airbag controller.

16. The system of claim 15 wherein said airbag controller is in communication with said airbag and said airbag includes a variable output inflator responsive to said collision severity value.

17. The system of claim 14 wherein said communication is over a network.

18. The method of claim 16 wherein said continuously monitoring includes repeating said receiving vehicle acceleration data from said SDM accelerometer, said calculating said SDM velocity, said calculating said SDM displacement and said calculating a collision severity value, wherein said repeating occurs on a periodic basis for a selected time interval following said detecting.

19. A method for continuous collisions severity prediction, the method comprising:

receiving vehicle acceleration data;

detecting a collision event in response to said receiving and to said acceleration data;

determining a collision mode in response to said detecting, wherein input to said determining includes said acceleration data; and calculating a collision severity value responsive to said acceleration data and to said collision mode wherein said collision severity value corresponds to a percentage inflation level of an airbag and said calculating is performed using a regression approach.

20. A method for continuous collisions severity prediction, the method comprising:

receiving vehicle acceleration data including:
- an elapsed time from collision detection, t;
- a SDM coefficient of displacement, ks;
- a SDM coefficient of velocity, kv;
- a SDM velocity at initial airbag deployment time, Vsd; and
- a SDM displacement at lime t, Ss(t);

detecting a collision event in response to said receiving and to said acceleration data;

determining a collision mode in response to said detecting, wherein input to said determining includes said acceleration data; and calculating a collision severity value responsive to said acceleration data and to said collision mode wherein said collision severity value corresponds to a percentage inflation level of an airbag and said calculating is performed in accordance with the equation: severity $(t) = (k_s \cdot \{Ss(t)/t^2\}) - (k_v \cdot \{Vsd/t\})$.

21. The method of claim 20 wherein said SDM coefficient of velocity and said SDM coefficient of displacement correspond to said collision mode.

* * * * *